United States Patent
Aikoh et al.

(10) Patent No.: US 6,788,627 B2
(45) Date of Patent: Sep. 7, 2004

(54) OPTICAL RECORDING AND REPRODUCING APPARATUS, TILT CORRECTION METHOD, TILT CORRECTION PROGRAM AND MEDIUM

(75) Inventors: Hideki Aikoh, Higashiosaka (JP); Tohru Nakamura, Katano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 545 days.

(21) Appl. No.: 09/893,756

(22) Filed: Jun. 27, 2001

(65) Prior Publication Data

US 2002/0006089 A1 Jan. 17, 2002

(30) Foreign Application Priority Data

Jun. 27, 2000 (JP) ........................... 2000-192267

(51) Int. Cl.[7] .................................................. G11B 7/00
(52) U.S. Cl. .................. 369/44.32; 369/53.19
(58) Field of Search .................. 369/44.32, 53.12, 369/53.19, 47.36, 47.38, 47.45, 53.42

(56) References Cited

U.S. PATENT DOCUMENTS 6,493,296 B1 * 12/2002 Fukumoto et al. ....... 369/44.32
6,526,007 B1 *  2/2003 Fujita ....................... 369/44.32

FOREIGN PATENT DOCUMENTS

JP            2635317          4/1997

* cited by examiner

Primary Examiner—Paul W. Huber
(74) Attorney, Agent, or Firm—RatnerPrestia

(57) ABSTRACT

Tilt correction means is operated so that the degree of modulation represented by the ratio of the amount of the detected reflected light from the groove areas G and the amount of the detected reflected light from the flat land areas L becomes maximal in a state wherein focus servo-control is made effective. Hence, the present invention can provide a system applicable to all optical disks including recording types and reproduction-only types, and capable of detecting a tilt correction signal without providing any special countermeasures on optical disks and devices, whereby it is possible to obtain an optical recording apparatus not adversely affecting the usage feeling of a user.

22 Claims, 6 Drawing Sheets

(a)

(b)

OPTICAL RECORDING AND REPRODUCING APPARATUS, TILT CORRECTION METHOD, TILT CORRECTION PROGRAM AND MEDIUM

BACKGROUND OF THE INVENTION

1. Field of the Invention

The present invention relates to an optical recording and reproducing apparatus for optically recording or reproducing information on a medium, such as an optical disk, and also relates to a tilt correction method, a tilt correction program and a medium.

2. Related Art of the Invention

In the present information-oriented age, technological development of high-density, large-capacity memory devices is proceeding actively. Capabilities required for such memory devices are high density, large capacity, high reliability, a rewritable function and the like. An optical disk is available as a medium capable of satisfying these requirements. The present invention relates to an optical recording apparatus for recording and reproducing information on such an optical disk used as a medium. Conventionally, numerous reports have been made as to the commercialization of optical disks and optical disk apparatuses for recording and reproducing the optical disks, typified by CD, MD and DVD systems, as well as technologies for them.

A DVD system and its drive will be described below as a conventional example referring to the accompanying drawings. FIGS. 7(a) to 7(c) are views illustrating schematic configurations of a digital video disk (DVD) serving as an optical disk and an optical head in an optical disk apparatus for reproducing information on the disk. The configurations and operations of the disk and apparatus will be described below.

In FIG. 7(a), numeral 6a designates a digital video disk (DVD) serving as a medium, i.e., an optical disk. Numeral 1 designates a spindle motor for rotating the DVD (6a) loaded thereon. Numeral 2 designates an optical head having a light-emitting portion and a light-receiving portion. Numeral 3 designates an object lens, mounted on the optical head 2, for condensing light emitted from the light-emitting portion into the information face of the DVD (6a) and thereby forming a light spot. Numeral 4 designates an object lens drive for driving the object lens 3 in a focus direction F and a tracking direction T so that the light spot stably follows the wobbling and eccentricity of the DVD (6a). Numeral 5 designates a drive shaft system for moving the optical head 2 in the radial direction of the DVD (6a).

Since the DVD (6a) is intended for reproduction only, flat land areas L and pit rows P are formed thereon, thereby forming tracks TR as an information face on which pit row information signals are recorded. FIG. 7(b) is a sectional view of the DVD (6a). The cross section shown herein is obtained by cutting the optical disk from its center to its outer circumference in a zigzag form so as to cross the pit rows without fail.

The reproduction operation of the DVD system will be described below. During reproduction on the DVD (6a), the optical head 2 emits DC light having a relatively small power, and a minute light spot is formed on a pit row on the information face by the object lens 3. To cope with wobbling and eccentricity owing to the rotation of the DVD (6a) by the spindle motor 1, the object lens 3 is driven in the focus direction F and the tracking direction T by the object lens drive 4 so as to follow the track and to form a stable light spot. With this configuration, the presence or absence of pits is detected depending on the intensity of the light reflected by pit rows, and information is reproduced as a pit information signal. In addition, by moving the optical head 2 in the radial direction of the DVD (6a) using the drive shaft system 5, it is possible to reproduce information signals in the whole area of the DVD (6a).

If the DVD (6a) has a large warp (tilt), the DVD system cannot stably detect the pit row signal. Generally, such a tilt occurs in the radial direction of the DVD (6a). In this case, by subjecting the drive shaft system 5 to rotation operation A around the axis in the tangential direction (TG) of a predetermined track (TR), the relative angle between the DVD (6a) and the optical head 2, that is, the relative angle between the DVD (6a) and the axis of the outgoing light from the object lens 3 is adjusted so that the pit row information signal can be reproduced with minimal errors. The predetermined track is a track wherein the light spot is formed. The graph of FIG. 7(c) illustrates the reproduction characteristic of the pit row information signal, wherein the abscissa represents the angle of the above-mentioned rotation of the drive shaft system 5, i.e., the amount of the tilt of the DVD (6a), and the ordinate represents the amount of reproduction jitter. By carrying out the rotation operation A of the drive shaft system 5, the relative angle between the DVD (6a) and the axis of the outgoing light of the object lens 3 is adjusted to an angle wherein the amount of reproduction jitter becomes nearly minimal. This adjustment performs the so-called tilt correction. Although the drive shaft system 5 is subjected to the rotation operation A as described above, another system is available wherein the object lens drive 4 has a function of subjecting the object lens 3 to rotation operation B around the axis in the tangential direction (TG) of the above-mentioned predetermined track TR in order to carry out tilt correction. Furthermore, the amount of the tilt for the tilt correction carried out in this way may be an amount of correction fixed beforehand by a drive, or the amount of correction may be determined each time the DVD (6a) is loaded. The configuration of the tilt correction thus differs depending on the drive.

Other components of the drive, that is, components not based on the purpose of the present invention, such as circuits and mechanisms, are not illustrated or explained herein.

The above-mentioned conventional configuration, however, has the following problems.

FIG. 7(a) illustrates a case wherein the DVD (6a) has a large warp (tilt), and the tilt occurs generally in the radial direction of the DVD (6a). In this case, the above-mentioned rotation operation A of the drive shaft system 5 and the above-mentioned rotation operation B of the object lens 3 by the object lens drive 4 are detected depending on the characteristic of the amount of the reproduction jitter shown in FIG. 7(c). Hence, it is necessary to detect the reproduction signal of the disk by carrying out the so-called focus servo-control, tracking servo-control and reproduction characteristic detection. In other words, the tilt correction operation for obtaining an optimum position by carrying out the above-mentioned rotation operations is substantially the same as a series of operations required for ordinary signal reproduction. Hence, the algorithm for the operations becomes complicated. Furthermore, this operation algorithm needs a constant time. For example, when the amount of correction in this tilt correction is fixed beforehand by the drive, a short time may be used at the completion time of drive operation. However, in the case when tilt correction is carried out each time the DVD (6a) is loaded, or when tilt correction is carried out every moment depending on the radial position on the DVD (6a), the proportion of the constant time becomes larger in comparison with the operation time for the function of reproducing an actual information signal. This is equivalent to reduction of the operation function of the drive in view of the usage feeling of a user.

Furthermore, in the conventional configuration, a pit row information signal is present as shown in FIG. 7(b), since the DVD (6a) is intended for reproduction only. However, in the case of a recording optical disk, no information signal is present. Hence, the characteristic of the amount of the reproduction jitter shown in FIG. 7(c), required to be detected for tilt correction, cannot be obtained, thereby causing a problem. To solve this problem, for example, a DVD-RAM system has a format wherein pit rows for tilt correction are provided beforehand on its optical disk itself. However, this kind of countermeasure is not taken for the MD, CD-R, CD-RW and DVD-R systems having already been available commercially. In other words, in the case when a recording optical disk, wherein any countermeasures, such as the pit rows for tilt correction, are not provided beforehand, has a large warp (tilt), tilt correction cannot be carried out, thereby causing a problem of making recording and reproduction unstable.

SUMMARY OF THE INVENTION

The present invention is intended to provide a system applicable to all optical disks including reproduction-only types and recording types, and capable of detecting a detection signal for tilt correction without providing any special countermeasures on optical disks and without using any special means and components in the drive, thereby providing an optical recording and reproducing apparatus, a tilt correction method and a tilt correction program not adversely affecting the usage feeling of a user.

One aspect of the present invention is an optical recording and reproducing apparatus for optically recording and reproducing information, comprising:

an optical head having (1) means of condensing light into a medium provided with first areas having dent portions or groove portions and substantially flat second areas, and (2) means of detecting signals from said medium, and tilt correction means of correcting the relative angle between said medium and the axis of light outgoing from said condensing means of said optical head, wherein while said medium is subjected to focus servo-control by using a light spot formed by said condensing means, said tilt correction means is operated so that a value based on the difference between the detection level of the reflected light in said first areas and the detection level of the reflected light in said second areas among the detection levels of light reflected by said medium and received and detected by said signal detection means becomes virtually maximal, thereby to correct said relative angle.

Another aspect of the present invention is an optical recording and reproducing apparatus in accordance with 1st invention, wherein said first areas are pit row areas, groove areas or sample pit areas, and said second areas are flat land areas.

Still another aspect of the present invention is an optical recording and reproducing apparatus, wherein the fact that said tilt correction means is operated so that said value becomes virtually maximal is understood that said tilt correction means is operated so that the value obtained by the following equation:

$$|\text{level 2} - \text{level 1}|/|\text{level 2} + \text{level 1}| \qquad [\text{Equation 1}]$$

becomes virtually maximal when said detection level of the reflected light in said first areas is level 1 and when said detection level of the reflected light in said second areas is level 2.

Yet another aspect of the present invention is an optical recording and reproducing apparatus, wherein said medium is an information reproducing medium having tracks wherein said pit row areas used as said first areas and said flat land areas used as said second areas are disposed alternately on a plane, or an information recording medium having tracks wherein said groove areas used as said first areas and said flat land areas used as said second areas are disposed alternately on a plane.

Still yet another aspect of the present invention is an optical recording and reproducing apparatus, wherein said medium is an information recording medium wherein said flat land areas, used as said second areas, for recording information and said sample pit areas, used as said first areas, for detecting a tracking error signal by the sample servo-control method are disposed on a plane.

A further aspect of the present invention is an optical recording and reproducing apparatus, wherein said medium is an information recording medium having said sample pit areas for detecting a tracking error signal by the sample servo-control method, said flat land areas surrounding said sample pit areas and used as said second areas, and groove areas for recording information, and adjustment is carried out so that the reflected light from either said sample pit areas or said groove areas is detected as the reflected light from said first areas.

A still further aspect of the present invention is an optical recording and reproducing apparatus, wherein said tilt correction means is a condensing means drive that can rotate said condensing means around the axis corresponding to the position of said condensing means the track direction on said medium.

A yet further aspect of the present invention is an optical recording and reproducing apparatus, wherein said tilt correction means is a liquid crystal element mounted on said optical head, having plural areas and being capable of changing the phase distribution of luminous fluxes passing through the respective areas depending on applied voltage.

A still yet further aspect of the present invention is an optical recording and reproducing apparatus, wherein a guide member for moving said optical head is provided, and said tilt correction means is a mechanism capable of rotating or deforming said guide member around the axis in a direction orthogonal to the movement direction of said optical head.

With the above-mentioned configuration, in the case when the tilt correction means is the above-mentioned condensing means drive, the above-mentioned liquid crystal element or the above-mentioned mechanism, either of these is operated depending on the above-mentioned detected and calculated signal, whereby the relative angle between the medium and the axis of the outgoing light from the condensing means can be controlled properly, and speedy tilt correction can be attained.

An additional further aspect of the present invention is an optical recording and reproducing apparatus for optically recording and reproducing information, comprising:

an optical head having (1) means of condensing light into a medium having tracks wherein pit rows or groove areasm, and flat land areas formed alternately on a plane, and (2) means of detecting signals from said medium, and tilt correction means of correcting the relative angle between said medium and the axis of outgoing light from said condensing means of said optical head, wherein while said medium is subjected to focus servo-control by using a light spot formed by said condensing means, and when said signal detection means receives and detects the reflected light from said medium owing to said light spot, said tilt correction means is operated so that a value obtained by the following equation:

$$|\text{level } L-\text{level } G|/|\text{level } L+\text{level } G| \qquad \text{[Equation 2]}$$

in the relationship between the level (level G) of the reflected light in said pit rows or said groove areas and the level (level L) of the reflected light in said flat land areas, becomes virtually maximal, thereby to correct said relative angle.

With the above-mentioned configuration, for example, in the case of using a medium having tracks wherein pit rows or groove areas and flat land areas are formed alternately on a plane, in the relationship between the level (level G) of the reflected light in the pit rows or groove areas and the level (level L) of the reflected light in the flat land areas, |level L−level G|/|level L+level G| is detected and calculated, and the tilt correction means is operated so as to make this value maximal, whereby the relative angle between the medium and the axis of the outgoing light from the condensing means can be controlled properly, and speedy tilt correction can be attained.

A still additional further aspect of the present invention is an optical recording and reproducing apparatus for optically recording and reproducing information, comprising:

an optical head having (1) means of condensing light into a medium wherein flat land areas and sample pit areas for detecting a tracking error signal by the sample servo-control method are formed on a plane, and (2) means of detecting signals from said medium, and tilt correction means of correcting the relative angle between said medium and the axis of outgoing light from said condensing means of said optical head, wherein while said medium is subjected to focus servo-control by using a light spot formed by said condensing means, and when said signal detection means receives and detects the reflected light from said medium owing to said light spot, said tilt correction means is operated so that a value obtained by the following equation:

$$|\text{level } L-\text{level } S|/|\text{level } L+\text{level } S| \qquad \text{[Equation 3]}$$

in the relationship between the level (level S) of the reflected light in said sample pit areas and the level (level L) of the reflected light in said flat land areas, becomes virtually maximal, thereby to correct said relative angle.

With the above-mentioned configuration, for example, in the case of using a medium wherein flat land areas and sample pit areas for detecting a tracking error signal by the sample servo-control method are formed alternately on a plane, in the relationship between the level (level S) of the reflected light in the sample pit rows and the level (level L) of the reflected light in the flat land areas, |level L−level S|/|level L+level S| is detected and calculated, and the tilt correction means is operated so as to make this value maximal, whereby the relative angle between the medium and the axis of the outgoing light from the condensing means can be controlled properly, and speedy tilt correction can be attained.

A yet additional further aspect of the present invention is a tilt correction method for correcting the relative angle between a medium and the axis of outgoing light from condensing means in an optical recording and reproducing apparatus for optically recording and reproducing information, comprising an optical head having (1) said condensing means of condensing light into said medium provided with first areas having dent portions or groove portions and substantially flat second areas, and (2) means of detecting signals from said medium, wherein while said medium is subjected to focus servo-control by using a light spot formed by said condensing means, said relative angle is corrected so that a value based on the difference between the detection level of the reflected light in said first areas and the detection level of the reflected light in said second areas among the detection levels of light reflected by said medium and received and detected by said signal detection means becomes virtually maximal.

A still yet further aspect of the present invention is a tilt correction method, wherein said first areas are pit row areas, groove areas or sample pit areas, and A supplementary further aspect of the present invention is a tilt correction method, wherein the fact that said relative angle is corrected so that said value becomes virtually maximal is understood that said relative angle is corrected so that the value obtained by the following equation:

$$|\text{level } 2-\text{level } 1|/|\text{level } 2+\text{level } 1| \qquad \text{[Equation 1]}$$

becomes virtually maximal when said detection level of the reflected light in said first areas is level 1 and when said detection level of the reflected light in said second areas is level 2.

A still supplementary aspect of the present invention is a program for allowing a computer to function as the whole or part of said tilt correction means of an optical recording and reproducing apparatus.

A yet still supplementary aspect of the present invention is a program for allowing a computer to execute all or part of steps of a tilt correction method.

A still yet supplementary aspect of the present invention is a medium having a program and/or data for allowing a computer to execute all or part of the functions of said tilt correction means of an optical recording and reproducing apparatus, said medium being able to be processed by the computer.

One aspect of the present invention is a medium having a program and/or data for allowing a computer to execute all or part of the operation steps of a tilt correction method, said medium being able to be processed by the computer.

With this configuration, for example, it is possible to provide a system capable of detecting a detection signal for tilt correction without providing any special countermeasures on optical disks and without using any special means and components in the drive, and it is possible to obtain an optical recording and reproducing apparatus not adversely affecting the usage feeling of a user.

BRIEF DESCRIPTION OF THE DRAWINGS

FIG. 2 is a view showing a liquid crystal element as an example of tilt correction means in accordance with this embodiment

FIG. 3 is a sectional view showing a reproduction-only optical disk C in an optical recording apparatus in accordance with Embodiment 2 of the present invention

FIG. 4(a) is a sectional view showing a recording optical disk D in an optical recording apparatus in accordance with Embodiment 3 of the present invention FIG. 4(b) is a view showing part of the plane of the recording optical disk D

FIG. 5 is a plan view of a recording optical disk E used for another example of the optical recording apparatus in accordance with Embodiment 3 of the present invention

FIG. 6 is a graph showing the experimental result of a TH characteristic in a state wherein the amount of a tilt is added to the recording optical disk E

FIG. 7(a) is a schematic configurational view of the optical head of an optical disk apparatus for reproducing information on a digital video disk (DVD) used as a conventional optical disk FIG. 7(b) is a sectional view of the digital video disk (DVD)

FIG. 7(c) is a view showing the characteristic of the amount of tilt and the amount of reproduction jitter

EXPLANATION OF REFERENCE NUMERALS

Figure 1A:
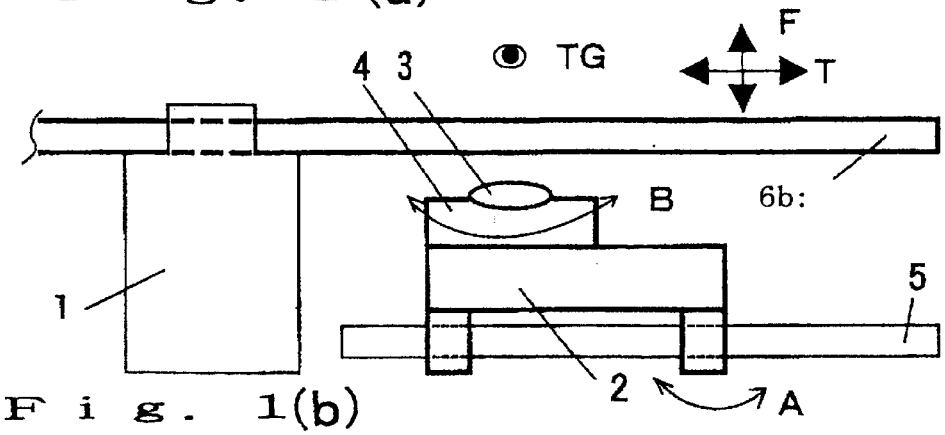
FIG. 1(a) is a schematic configurational view of the optical head of an optical recording apparatus in accordance with Embodiment 1 of the present invention

1 spindle motor
2 optical head
3 object lens
4 object lens drive
5 drive shaft system
6a, 6b, 6c, 6d, 6e optical disk

PREFERRED EMBODIMENTS OF THE INVENTION (Embodiment 1)

The configuration and operation of Embodiment 1 of the present invention will be described below referring to FIG. 1.

FIG. 1(a) is a view illustrating the schematic configuration of an optical head in an optical recording apparatus in accordance with Embodiment 1, and the configuration and operation thereof will be described below. In FIG. 1(a), numeral 6b designates a medium, that is, a recording optical disk A. Numeral 1 designates a spindle motor for rotating the recording optical disk A (6b) loaded thereon. Numeral 2 designates an optical head having a light-emitting portion and a light-receiving portion. Numeral 3 designates an object lens, mounted on the optical head 2, for condensing light emitted from the light-emitting portion into the information face of the recording optical disk A (6b) and thereby forming a light spot. Numeral 4 designates an object lens drive for driving the object lens 3 in a focus direction F and a tracking direction T so that the light spot stably follows the wobbling and eccentricity of the recording optical disk A (6b). Numeral 5 designates a drive shaft system for moving the optical head 2 in the radial direction of the recording optical disk A (6b). It is herein assumed that the object lens drive 4 has a function of performing the rotation operation B of the object lens 3 around the axis in a tangential direction TG in parallel with a track TR on the disk.

Figure 1B:
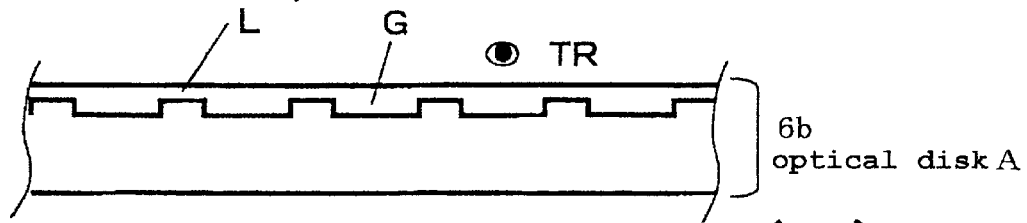
FIG. 1(b): a sectional view of a recording optical disk A FIGS. 1(c1), (c2) is graphs showing detection signals

FIG. 1(b) is a partially sectional view of the recording optical disk A (6b) being cut in the radial direction thereof. Flat land areas L and groove areas G are formed alternately on a plane to form tracks TR. Information is formed in the groove areas G.

The operation of this optical recording apparatus will be described below together with the explanation of an embodiment of the tilt correction method in accordance with the present invention.

Figure 7:
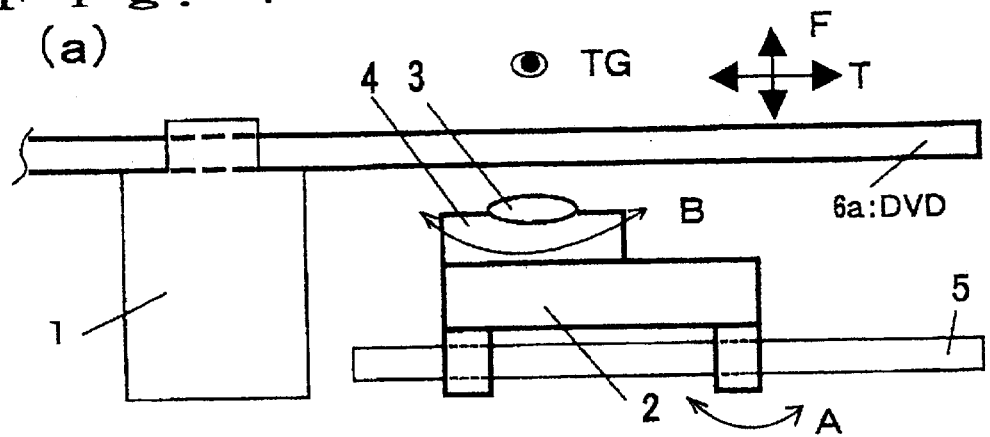
[FIG. 7]
Figure 7:
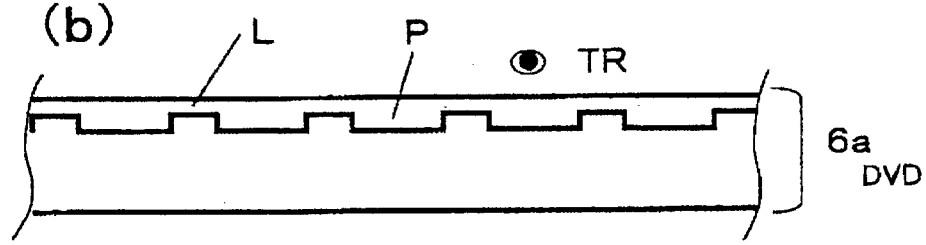
Figure 7:
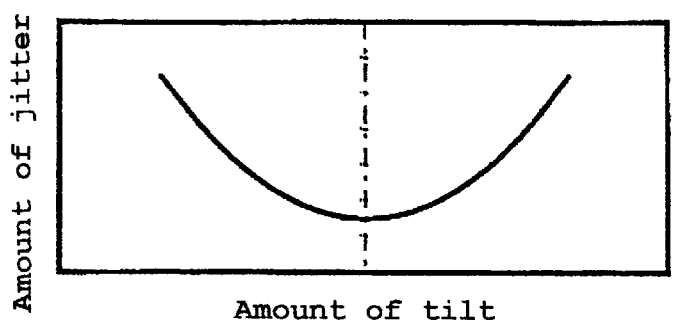

During reproduction on the recording optical disk A (6b), the optical head 2 emits DC light having a relatively small power, and the information in the groove areas G is reproduced. This operation is the same as the operation of the conventional example shown in FIGS. 7(a) to 7(c), and the numerals of the components are made common to those of the conventional example. During recording on the recording optical disk A (6b), the optical head 2 emits DC light having a relatively large power, and information is recorded in the groove areas G. This operation is also the same as the operation of the conventional example shown in FIGS. 7(a) to 7(c), and the numerals of the components are made common to those of the conventional example.

First areas in accordance with the present invention correspond to the groove areas G, and second areas in accordance with the present invention corresponds to the flat land areas L.

The tilt correction signal detection operation for detecting the warp (tilt) of the recording optical disk A (6b) will be described here. Generally, a tilt occurs in the radial direction of the recording optical disk A (6b).

Figure 1:
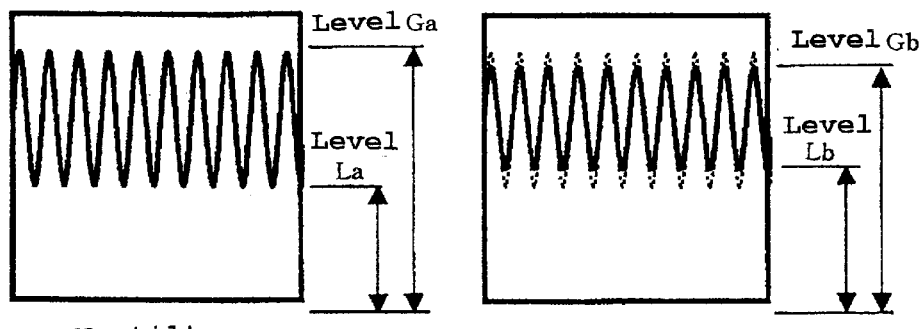
[FIG. 1]

First, as an ordinary operation, in a state wherein a light spot is formed on the recording optical disk A (6b) and focus servo-control is made effective by driving the object lens drive 4, the signal detection means of the optical head 2 receives the total amount of the reflected light from the recording optical disk A (6b), whereby it is possible to obtain detection signals shown in FIGS. 1 (C1) and 1 (C2). When it is assumed that the level of the detection signal in the flat land areas L is level L and that the level of the detection signal in the groove areas G is level G, the object lens drive 4 alternately crosses the flat land areas L and the groove areas G present on the recording optical disk A (6b) because of the eccentricity of the rotation center of the optical disk for example, since tracking servo-control is not effective although focus servo-control is effective. This generates a detection signal alternately having the level L and the level G corresponding to the reflected light from the respective areas. Generally, in the case of such an optical disk as the optical disk A (6b) wherein information is formed in the groove areas G, the width of the groove areas G is larger than the width of the land areas L in FIG. 1(b). Hence, the level G of the groove areas G becomes higher than the level L of the flat land areas L owing to diffraction components included in the reflected light in the flat land areas L and the groove areas G depending on the relationship to the light spot to be formed. As a result, such a signal as shown in FIG. 1 (c1) is obtained. The tilt correction signal is herein defined by the following equation.

The level 1 and the level 2 in accordance with the present invention correspond to the level G and the level L in accordance with this embodiment.

$$TH = |\text{level } L - \text{level } G| / |\text{level } L + \text{level } G| \qquad \text{[Equation 2]}$$

In a state wherein no tilt occurs on the recording optical disk A (6b), subscript "a" is additionally written and the following equation is obtained.

$$THa = |\text{level } La - \text{level } Ga| / |\text{level } La + \text{level } Ga| \qquad \text{[Equation 4]}$$

Next, in a state wherein a tilt is present on the recording optical disk A (6*b*), subscript "b" is additionally written and the following equation is obtained.

$$THb = |\text{level } Lb - \text{level } Gb| / |\text{level } Lb + \text{level } Gb| \quad \text{[Equation 5]}$$

When a tilt is present on the recording optical disk A (6*b*) in the radial direction thereof in this way, a light spot to be formed causes comatic aberration. Hence, the shape of the light spot in a direction (the tracking direction T) perpendicular to the track TR becomes larger in the sectional view of FIG. 1(*b*).

The inventors of the present application paid attention to this phenomenon in the shape of the light spot and the level of the reflected light. In other words, the reflected light from the groove areas G wider than the flat land areas L is affected and has level Gb lower than level Ga. On the other hand, the reflected light from the flat land areas L narrower than the groove areas G becomes lower in resolution and has level Lb higher than level La.

That is to say, in accordance with the above-mentioned phenomenon, level Ga lowers to level Gb, and level La rises to level Lb. When THa is compared with THb at this time, THb becomes smaller than THa. This means that the tilt correction signal has changed. The characteristic shown in the graph of FIG. 1(*d*) is obtained when the abscissa represents the amount of the tilt of the recording optical disk A (6*b*) and when the ordinate represents the tilt correction signal TH defined in this embodiment.

As a result, when the object lens 3 is subjected to the rotation operation B around the axis in the tangential direction of the track TR by the object lens drive 4 on the basis of the TH characteristic shown in FIG. 1(*d*) so that THb becomes THa, the object lens drive 4 functions as tilt correction means. It is thus possible to adjust the relative angle between the recording optical disk A (6*b*) and the axis of the outgoing light from the object lens 3. Hence, even in the recording optical disk A (6*b*), it is possible to correct the amount of a tilt present thereon.

It is herein assumed that the optical disk is a recording optical disk B (6*c*) wherein the width of the groove areas G is equal to that of the land areas L as shown in FIG. 1(*e*). In this kind of optical disk, information may be formed in both the groove areas G and the land areas L in some cases in order to increase the capacity of the optical disk. In the case shown in FIG. 1(*e*), when the signal detection means of the optical head 2 detects the whole amount of the reflected light from the recording optical disk B (6*c*) as described above while the focus servo-control is made effective, there is no difference between the detection signal level L in the flat land areas L and the detection signal level G in the groove areas G, whereby the tilt correction signal TH cannot be detected as a modulation signal. In the case of this recording optical disk B (6*c*), the reflected light is divided in parallel with the track TR by the signal detection means of the optical head 2. From the detection signal on one side of the divided reflected light, level L and level G are detected alternately from the reflected light from the flat land areas L and the reflected light from the groove areas G respectively to obtain the detection signal shown in FIG. 1(*c*). The amount of the tilt present as described above can thus be corrected. Hence, this kind of system is also included in the present invention.

Next, the tilt correction means will be described. Even when the drive axis system 5 is subjected to the rotation operation A as shown in FIG. 1(*a*) so that THb becomes THa, the configuration functions as the tilt correction means, and the relative angle between the recording optical disk A (6*b*) and the axis of the outgoing light from the object lens 3 can be adjusted. Hence, the amount of the tilt present on the recording optical disk A (6*b*) can be corrected just as in the case of the rotation operation B.

Figure 2:
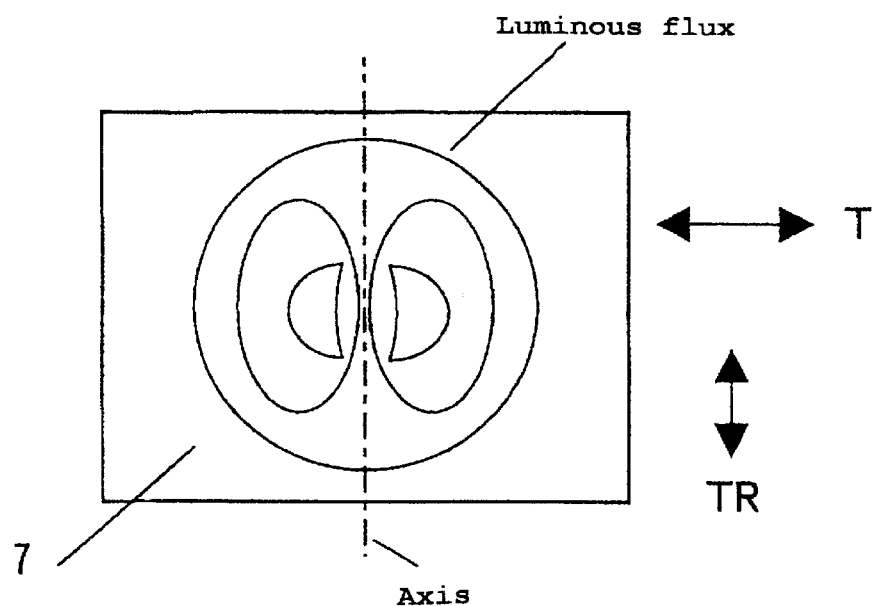
[FIG. 2]

A liquid crystal element 7 shown in FIG. 2 may be used to correct the amount of the tilt. The liquid crystal element 7 shown in FIG. 2 is mounted on the optical head 2 and has a plurality of-areas symmetrical with respect to an axis in parallel with the track TR and passing through the center of a luminous flux entering the object lens 3. The refractive index of each area is changed by a voltage applied externally thereto, whereby the phase distribution of the luminous flux passing through each area can be changed. In other words, the phase distribution is cancelled by the phase distribution on the recording optical disk A (6*b*) in the case when a tilt is present, and the phase distribution of the light spot formed by the object lens 3 can be made nearly flat, whereby setting can be performed so as not to cause comatic aberration. Hence, by controlling the voltage applied to the liquid crystal element so that THb becomes THa, the liquid crystal element functions as a tilt correction means. It is therefore possible to correct the amount of the tilt present on the recording optical disk A (6*b*), just as in the cases of the rotation operation B and the rotation operation A.

As described above, the tilt correction means is operated so that THb becomes THa, in other words, so that the tilt correction signal TH becomes nearly maximal. The timing of the operation is described below. A fixed amount of tilt correction for an optical recording apparatus may be set beforehand for the recording optical disk A (6*b*) used as a reference disk, or the amount of tilt correction may be determined each-time the recording optical disk A (6*b*) is loaded in the optical recording apparatus. In a still further case, tilt correction is carried out every moment depending on the radial direction of the recording optical disk A (6*b*) The modes of timing in these cases differ depending on the optical recording apparatus.

In Embodiment 1, other components of the optical recording apparatus, that is, components not based on the purpose of the present invention, such as circuits and mechanisms, are not illustrated or explained herein.

As described above, this embodiment can provide an excellent system capable of detecting a tilt correction signal even in the case of the recording optical disks A (6*b*) and B (6*c*) having no information signal recorded beforehand, without providing any special countermeasures on optical disks and without using any special means and components in the optical recording apparatus.

Furthermore, the above-mentioned operation for making focus servo-control effective can be processed as part of a sequential operation for general signal reproduction of an ordinary optical recording apparatus. Hence, the algorithm of the operation is very simple, and no special time is required for tilt correction.

In other words, in the case when an amount of tilt correction is set each time the recording optical disk A (6*b*) or B (6*c*) is loaded in the optical recording apparatus, or when tilt correction is carried out every moment depending on the radial position of the recording optical disk A (6*b*) or B (6*c*), the proportion of the time for tilt correction in the operation time for the recording function and the reproduction function of an actual information signal is not so high. Hence, it is possible to say that an optical recording apparatus not affecting the usage feeling of a user is obtained.

(Embodiment 2)

Figure 3:
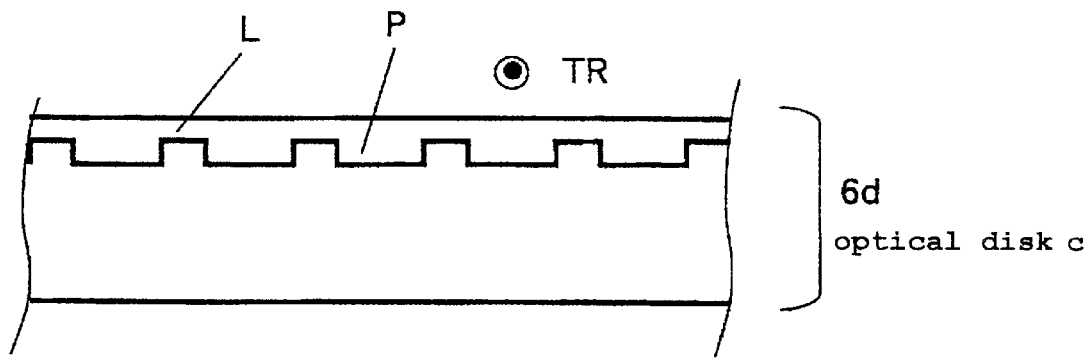
[FIG. 3]

Embodiment 2 in accordance with the present invention will be described below referring to FIG. 3. The cross section shown in FIG. 3 is obtained by cutting an optical disk from its center to its outer circumference in a zigzag form so as to cross pit rows without fail.

The schematic configuration of the optical head in the optical recording apparatus of this embodiment is completely the same as that of Embodiment 1 shown in FIG. 1(a). However, 6d designates a reproduction-only optical disk C on which flat land areas L and areas of pit rows P as shown in FIG. 3 are formed and tracks TR for pit row information signals are formed as an information side. Even in this case, the operation of this embodiment is completely the same as that of Embodiment 1. However, in Embodiment 1, the level of the detection signal in the groove areas G is set at level G. In this embodiment, pit rows are pit row areas P, and the level of the detection signal is set at level P, whereby the detection signal shown in FIG. 1(c) can be obtained. It is assumed that the tilt correction signal TH is defined depending on the detection signal as follows:

$$TH = |\text{level } L - \text{level } P|/|\text{level } L + \text{level } P| \quad \text{[Equation 6]}$$

Figure 1D:
FIG. 1(d) is a graph showing a tilt correction signal
Figure 1E:
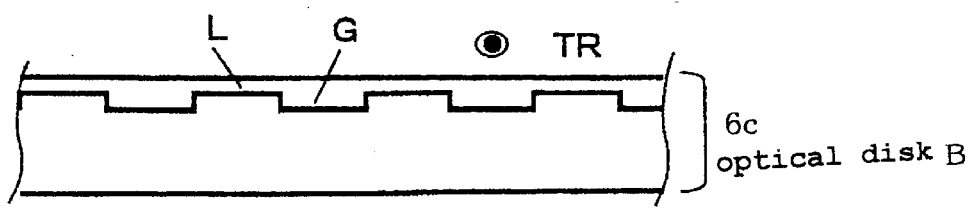
FIG. 1(e) is a sectional view of a recording optical disk B

The tilt correction signal TH has the characteristic shown in FIG. 1(d) with respect to the amount of the tilt of the reproduction-only optical disk C (6d). Hence, even in the case of the reproduction-only optical disk C (6d) in this embodiment, it is possible to attain an optical recording apparatus having an effect similar to that of Embodiment 1.

The first areas in accordance with the present invention correspond to the pit row areas (P), and the second areas in accordance with the present invention correspond to the flat land areas (L). In addition, the level 1 and level 2 in accordance with the present invention correspond to the level P and level L of this embodiment.

(Embodiment 3)

Figure 4:
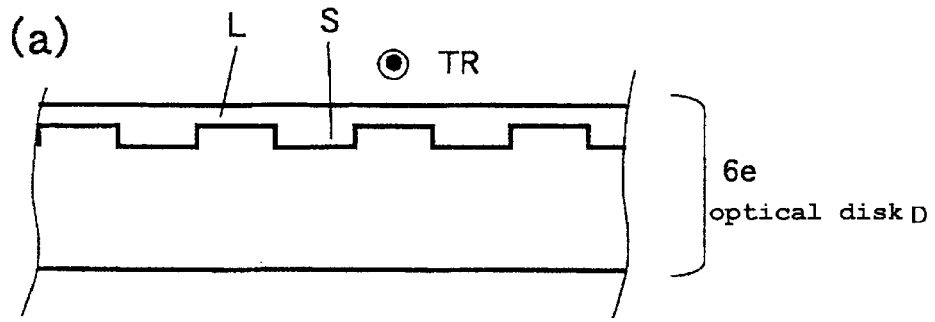
[FIG. 4]
Figure 4:
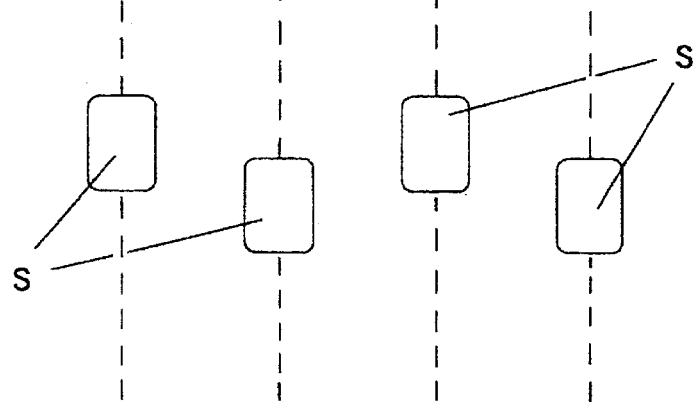

Embodiment 3 in accordance with the present invention will be described below referring to FIG. 4. The schematic configuration of the optical head in the optical recording apparatus of this embodiment is completely the same as that of Embodiment 1 shown in FIG. 1(a). However, 6e designates a recording optical disk D on which flat land areas L and sample pit areas S for detecting a tracking error signal based on the sample servo-control method are formed on a plane. The first areas in accordance with the present invention correspond to the sample pit areas (S), and the second areas in accordance with the present invention correspond to the flat land areas (L).

FIG. 4(b) shows the sample pit areas S dispersed on the plane of the recording optical disk D (6e) and part of the tracks TR. Even in this case, the operation of this embodiment is completely the same as that of Embodiment 1. However, in Embodiment 1, the level of the detection signal in the groove areas G is set at level G. In this embodiment, the sample pit areas are used as the sample pit areas S, and the level of the detection signal in the areas is set at level S, whereby it is possible to obtain a detection signal nearly similar to the detection signal shown in FIG. 1(c), although dispersed somewhat. It is assumed that the tilt correction signal TH is defined as follows depending on the detection signal:

$$TH = |\text{level } L - \text{level } S|/|\text{level } L + \text{level } S| \quad \text{[Equation 3]}$$

The tilt correction signal TH has the characteristic shown in FIG. 1(d) with respect to the amount of the tilt of the recording optical disk D (6e) Hence, even in the case of the recording optical disk D (6e) of this embodiment, it is possible to attain an optical recording apparatus having an effect similar to that of Embodiment 1.

The level 1 and level 2 in accordance with the present invention correspond to the level S and level L in accordance with this embodiment.

In this embodiment, the optical disk (6b) is the recording optical disk D having the flat land areas L (information signal recording areas) in areas other than the sample pit areas S (the areas for detecting a tracking error signal by the sample servo-control method). However, the optical disk (6b) is not limited to this disk, but may be a recording optical disk E (6f) (see FIG. 5) having not only above-mentioned sample pit areas S but also such groove areas G as those described in the explanation of Embodiment 1 as areas for recording information signals.

When detecting the tilt correction signal (TH) in that case, at the design stage of the optical recording apparatus as described later, a determination is made as to whether the reflected light (described in the explanation of Embodiment 3) from the sample pit areas (S) or the reflected light (described in the explanation of Embodiment 1) from the groove areas can be detected. As a result, an optical recording apparatus having an effect similar to the above-mentioned effect can be attained as a matter of course.

Figure 5:
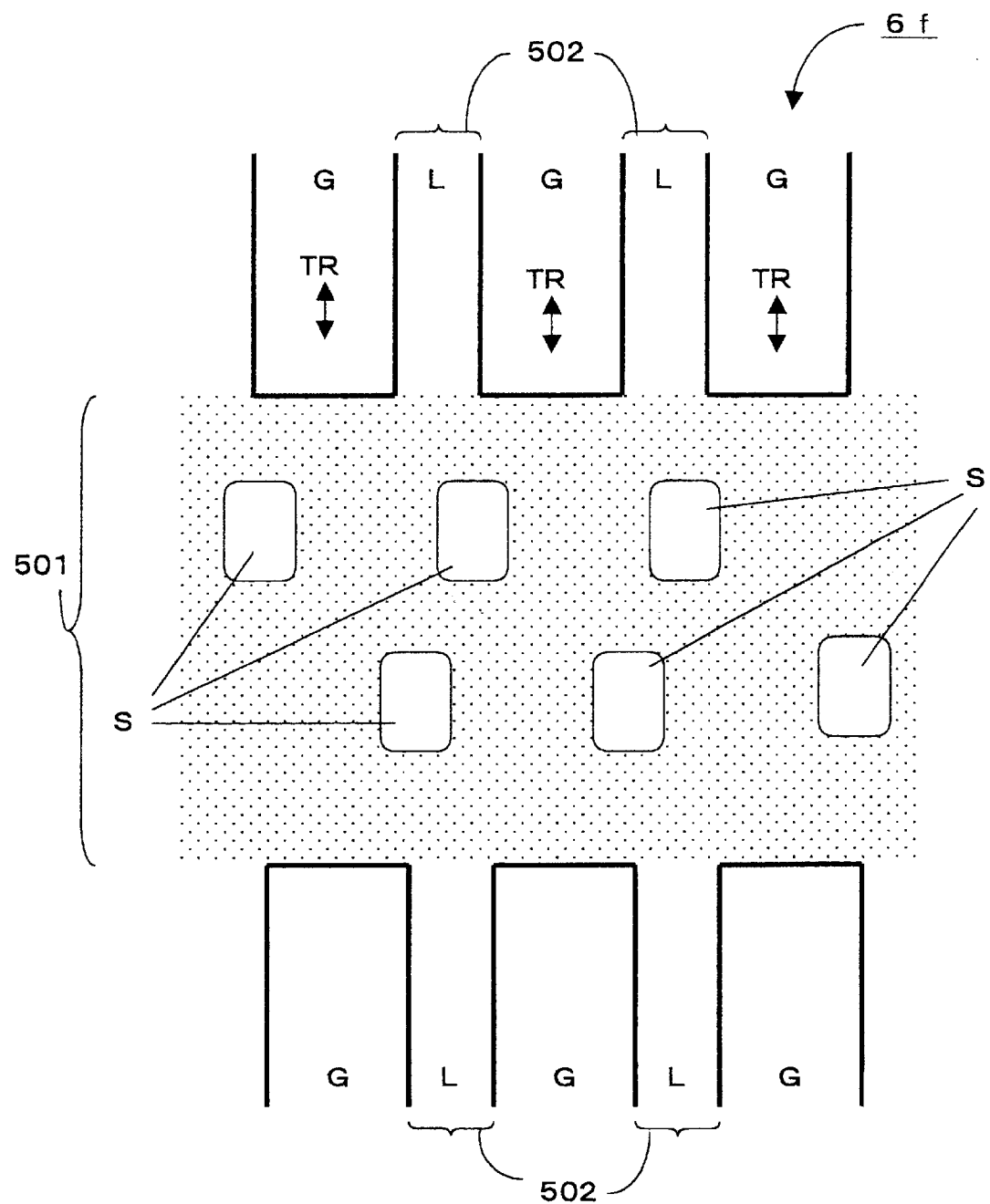
[FIG. 5]

Next, the tilt correction signal TH defined by the above-mentioned equation 3 will be further described below referring to FIG. 5 by using the recording optical disk E (6f) provided with the flat land areas (L), the sample pit areas (S) and the groove areas (G) for recording information signals.

It is herein assumed that the wavelength of the light source of the light-emitting portion is set at 660 nm and that the track pitch is relatively small in order to raise the density of the recording capacity of the optical disk. Among the reflected light from the groove areas (G), the diffraction light owing to lands and grooves does not enter the object lens 3, since the diffraction angle is large. Hence, the amount of the detected light at the land becomes substantially identical to that at the groove.

Therefore, in this case, it is impossible to detect the tilt correction signal (TH) by using the reflected light from the flat land areas (L) and the reflected light from the groove areas (G). Hence, in this case, the reflected light from the flat land areas (L) and the reflected light from the sample pit areas (S) are used in order to detect the tilt correction signal (TH) However, the reflected light from an area 501 on the periphery of the sample pit areas (S) (the area 501 is generally referred to as a mirror area, and is part of the flat land areas and an area indicated by dots in FIG. 5) is herein used as the reflected light from the flat land areas (L).

At this time, the level of the amount of the reflected light from the sample pit areas (S) becomes lower than that of the reflected light from the flat land areas (L) owing to the effect of diffraction light. Hence, the detection signal obtained in a state wherein only the focus servo-control is made effective becomes a modulated signal as shown in FIGS. 1(c1) and 1(c2).

Figure 6:
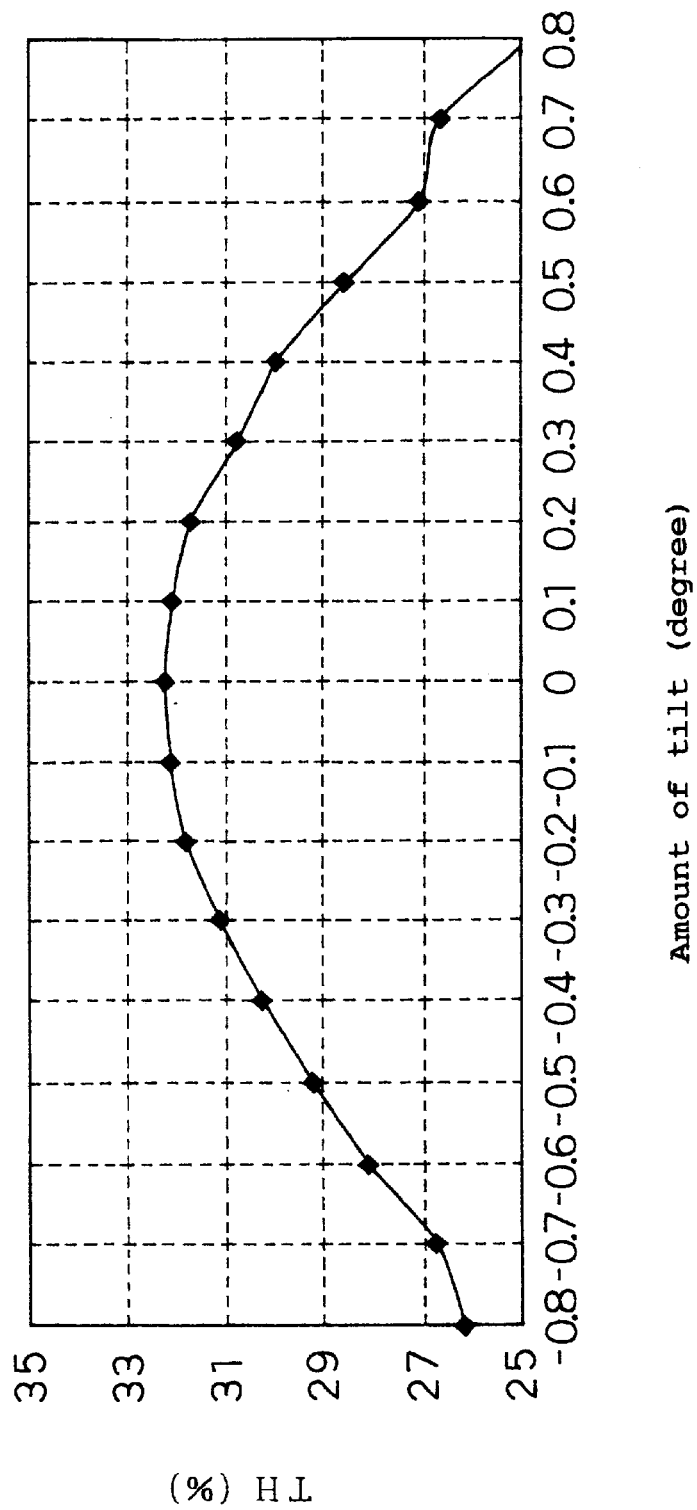
[FIG. 6]

FIG. 6 shows the TH characteristic defined as described above by adding the amount of the tilt to the recording optical disk E (6f) and obtained as a result of an experiment. It is understood that the TH characteristic shown in FIG. 6 is the same as that shown in FIG. 1(d).

As the result of the experiment, it is possible to say that the correction of the amount of a tilt within ±0.1 degree, that is, the correction of the relative angle between the optical axis of the outgoing light from the condensing means and the optical disk (medium), can be carried out.

In the case of the recording optical disk E (6f), since the groove areas (G) are not subjected to the tracking control, the sample pit areas (S) are subjected to the tracking servo-control. In this case, the light spot formed by the object lens 3 traces the grooves (G). Hence, accurate information recording and reproduction can be made at the groove areas (G) used as areas for information recording and reproduction, regardless of the presence or absence of the diffraction light at the groove areas (G). For example, in the case of a magneto-optical medium, the Kerr effect component included in the detected light is detected, and in the case of a phase-change medium, detection is carried out on the basis of a change in reflectivity.

In order to raise the density of information to be recorded, an optical disk having a relatively small track pitch has been described. However, this embodiment is not limited to this case. When the track pitch is relatively large for example, it is possible to use the reflected light from the areas other than the area 501 in the flat land areas (L), that is, the reflected light from areas 502 disposed in parallel with the groove areas (G), as a matter of course. Even in this case, the reflected light from the area 501 should preferably be used.

Furthermore, in order to raise the density of information to be recorded, an optical disk having a relatively small track pitch has been described. However, this embodiment is not limited to this case. When the track pitch is relatively large for example, the reflected light from the flat land areas (L) and the reflected light from the groove areas (G) can be used to detect the tilt correction signal (TH). Even in this case, an effect similar to the above-mentioned effect can be obtained.

Still further, in the above-mentioned embodiments, an optical recording apparatus has been mainly described. However, not limited to this, the present invention is also applicable to a reproduction-only apparatus for reproducing optically recorded information, for example.

Still further, the present invention relates to a program for carrying out all or part of means (or devices, elements, circuits, etc.) of the above-mentioned optical recording apparatus or reproduction-only apparatus of the present invention by using a computer, and the program operates in cooperation with the computer.

Moreover, the present invention relates to a program for carrying out all or part of steps (or operations, actions, etc.) of the above-mentioned tilt correction method of the present invention by using a computer, and the program operates in cooperation with the computer.

Part of means (or devices, elements, circuits, etc.) of the present invention or part of steps (or processes, operations, actions, etc.) of the present invention designates several means or steps in plural means or steps of the present invention, respectively, or designates part of a function or operation in one means or step, respectively.

Furthermore, part of devices (or elements, circuits, etc.) of the present invention designates several devices in plural devices, or designates part of means (or elements, circuits, etc.) in one device, or designates part of a function of one means.

Still further, the present invention includes a recording medium on which the program of the present invention is recorded so as to be readable by a computer.

Still further, a utilization mode of the program of the present invention may be a mode wherein the program is recorded on a recording medium readable by a computer and operates in cooperation with the computer.

Still further, another utilization mode of the program of the present invention may be a mode wherein the program is transmitted through a transmission medium and read by a computer and operates in cooperation with the computer.

Still further, ROM and the like are included as recording media, and transmission media, such as the Internet, as well as light, electric waves, sound waves, etc. are included as transmission media.

Still further, the above-mentioned computer of the present invention is not limited to pure hardware, such as a CPU, but may be firmware or OS, or may include a computer having peripheral devices.

The configuration of the present invention may be attained by software or by hardware as described above.

As described above, the optical recording apparatus in accordance with the present invention comprises an optical head equipped with means of condensing light into a medium having tracks on which pit rows or groove areas and flat land areas are formed alternately on a plane and means of detecting signals from the medium, and tilt correction means of correcting the relative angle between the medium and the axis of the outgoing light from the condensing means of the optical head. When a light spot is formed by the condensing means and when the reflected light from the medium owing to the light spot is received and detected by the signal detection means in a state wherein the medium is subjected to focus servo-control, the relative angle between the medium and the axis of the outgoing light from the condensing means is corrected by operating the tilt correction means so that level |level L−level G|/|level L+level G| becomes nearly maximal in the relationship between the level (level G) of the reflected light in the pit rows or the groove areas and the level (level L) of the reflected light in the flat land areas.

The above-mentioned medium may be a medium wherein the flat land areas and the sample pit areas for detecting a tracking error signal by the sample servo-control method are formed on a plane.

The above-mentioned tilt correction means is a condensing means drive configured so that it can move the condensing means in a focus direction perpendicular to the medium and in a radial direction in parallel with the optical head movement direction on a plane in parallel with the medium, and so that it can rotate around the axis in a tangential direction orthogonal to the radial direction of the medium. Furthermore, the tilt correction means may be a liquid crystal element mounted on the optical head, having plural areas and being capable of changing the phase distribution of the luminous fluxes passing through the corresponding areas depending on the applied voltage. Still further, the tilt correction means may be a mechanism for deforming or moving part or whole of a guide member disposed in parallel with the movement direction of the optical head on a plane in parallel with the medium so that the optical head can rotate around the center axis in the tangential direction orthogonal to the movement direction on the plane in parallel with the medium.

With this configuration, the present invention can provide a system applicable to all optical disks including reproduction-only types and recording optical types, and capable of detecting a detection signal for tilt correction without providing any special countermeasures on optical disks and without using any special means and components in the drive, whereby it is possible to obtain an optical recording apparatus not adversely affecting the usage feeling of a user.

AS clarified by the above descriptions, the present invention can provide a tilt correction system applicable to all optical disks including reproduction-only types and recording optical types, and capable of detecting a detection signal for tilt correction without providing any special countermeasures on optical disks and without using any special means and components in the drive, whereby it is possible to obtain an optical recording and reproducing apparatus not adversely affecting the usage feeling of a user.

What is claimed is:

1. An optical recording and reproducing apparatus for optically recording and reproducing information, comprising:

an optical head having (1) means of condensing light into a medium provided with first areas having dent portions or groove portions and substantially flat second areas, and (2) means of detecting signals from said medium, and tilt correction means of correcting the relative angle between said medium and the axis of light outgoing from said condensing means of said optical head, wherein while said medium is subjected to focus servo-control by using a light spot formed by said condensing means, said tilt correction means is operated so that a value based on the difference between the detection level of the reflected light in said first areas and the detection level of the reflected light in said second areas among the detection levels of light reflected by said medium and received and detected by said signal detection means becomes virtually maximal, thereby to correct said relative angle.

2. An optical recording and reproducing apparatus in accordance with claim 1, wherein said first areas are pit row areas, groove areas or sample pit areas, and said second areas are flat land areas.

3. An optical recording and reproducing apparatus in accordance with claim 1, wherein the fact that said tilt correction means is operated so that said value becomes virtually maximal is understood that said tilt correction means is operated so that the value obtained by the following equation:

$$|\text{level 2}-\text{level 1}|/|\text{level 2}+\text{level 1}| \qquad [\text{Equation 1}]$$

becomes virtually maximal when said detection level of the reflected light in said first areas is level 1 and when said detection level of the reflected light in said second areas is level 2.

4. An optical recording and reproducing apparatus in accordance with any one of claims 1 to 3, wherein said medium is an information reproducing medium having tracks wherein said pit row areas used as said first areas and said flat land areas used as said second areas are disposed alternately on a plane, or an information recording medium having tracks wherein said groove areas used as said first areas and said flat land areas used as said second areas are disposed alternately on a plane.

5. An optical recording and reproducing apparatus in accordance with any one of claims 1 to 3, wherein said medium is an information recording medium wherein said flat land areas, used as said second areas, for recording information and said sample pit areas, used as said first areas, for detecting a tracking error signal by the sample servo-control method are disposed on a plane.

6. An optical recording and reproducing apparatus in accordance with any one of claims 1 to 3, wherein said medium is an information recording medium having said sample pit areas for detecting a tracking error signal by the sample servo-control method, said flat land areas surrounding said sample pit areas and used as said second areas, and groove areas for recording information, and adjustment is carried out so that the reflected light from either said sample pit areas or said groove areas is detected as the reflected light from said first areas.

7. An optical recording and reproducing apparatus in accordance with any one of claims 1 to 3, wherein said tilt correction means is a condensing means drive that can rotate said condensing means around the axis corresponding to the position of said condensing means in the track direction on said medium.

8. An optical recording and reproducing apparatus in accordance with any one of claims 1 to 3, wherein said tilt correction means is a liquid crystal element mounted on said optical head, having plural areas and being capable of changing the phase distribution of luminous fluxes passing through the respective areas depending on applied voltage.

9. An optical recording and reproducing apparatus in accordance with any one of claims 1 to 3, wherein a guide member for moving said optical head is provided, and said tilt correction means is a mechanism capable of rotating or deforming said guide member around the axis in a direction orthogonal to the movement direction of said optical head.

10. An optical recording and reproducing apparatus for optically recording and reproducing information, comprising:

an optical head having (1) means of condensing light into a medium having tracks wherein pit rows or groove areas, and flat land areas formed alternately on a plane, and (2) means of detecting signals from said medium, and tilt correction means of correcting the relative angle between said medium and the axis of outgoing light from said condensing means of said optical head, wherein while said medium is subjected to focus servo-control by using a light spot formed by said condensing means, and when said signal detection means receives and detects the reflected light from said medium owing to said light spot, said tilt correction means is operated so that a value obtained by the following equation:

$$|\text{level } L-\text{level } G|/|\text{level } L+\text{level } G| \qquad [\text{Equation 2}]$$

in the relationship between the level (level G) of the reflected light in said pit rows or said groove areas and the level (level L) of the reflected light in said flat land areas, becomes virtually maximal, thereby to correct said relative angle.

11. An optical recording and reproducing apparatus for optically recording and reproducing information, comprising:

an optical head having (1) means of condensing light into a medium wherein flat land areas and sample pit areas for detecting a tracking error signal by the sample servo-control method are formed on a plane, and (2) means of detecting signals from said medium, and tilt correction means of correcting the relative angle between said medium and the axis of outgoing light from said condensing means of said optical head, wherein while said medium is subjected to focus servo-control by using a light spot formed by said condensing means, and when said signal detection means receives and detects the reflected light from said medium owing to said light spot, said tilt correction means is operated so that a value obtained by the following equation:

$$|\text{level } L-\text{level } S|/|\text{level } L+\text{level } S| \qquad [\text{Equation 3}]$$

in the relationship between the level (level S) of the reflected light in said sample pit areas and the level (level L) of the reflected light in said flat land areas, becomes virtually maximal, thereby to correct said relative angle.

12. A program for allowing a computer to function as the whole or part of said tilt correction means of an optical recording and reproducing apparatus in accordance with any one of claims 1 to 3 or 10 or 11.

13. A medium having a program and/or data for allowing a computer to execute all or part of the functions of said tilt correction means of an optical recording and reproducing apparatus in accordance with any one of claims 1 to 3 or 10 or 11, said medium being able to be processed by the computer.

14. A tilt correction method for correcting the relative angle between a medium and the axis of outgoing light from condensing means in an optical recording and reproducing apparatus for optically recording and reproducing information, comprising an optical head having (1) said condensing means of condensing light into said medium provided with first areas having dent portions or groove portions and substantially flat second areas, and (2) means of detecting signals from said medium, wherein while said medium is subjected to focus servo-control by using a light spot formed by said condensing means, said relative angle is corrected so that a value based on the difference between the detection level of the reflected light in said first areas and the detection level of the reflected light in said second areas among the detection levels of light reflected by said medium and received and detected by said signal detection means becomes virtually maximal.

15. A tilt correction method in accordance with claim 14, wherein said first areas are pit row areas, groove areas or sample pit areas, and said second areas are flat land areas.

16. A tilt correction method in accordance with claim 14, wherein the fact that said relative angle is corrected so that said value becomes virtually maximal is understood that said relative angle is corrected so that the value obtained by the following equation:

|level 2−level 1|/|level 2+level 1|    [Equation 1]

becomes virtually maximal when said detection level of the reflected light in said first areas is level 1 and when said detection level of the reflected light in said second areas is level 2.

17. A program for allowing a computer to execute all or part of steps of a tilt correction method in accordance with any one of claims 14 to 16.

18. A medium having a program and/or data for allowing a computer to execute all or part of the operation steps of a tilt correction method in accordance with any one of claims 14 to 16, said medium being able to be processed by the computer.

19. In an optical recording and reproducing apparatus focusing a light beam on an information medium having grooved portions and flat portions, the grooved portions interleaved with the flat portions, a method of correcting a relative angle between the light beam and the information medium comprising the steps of:

(a) focusing the light beam on first areas having grooved portions and second areas having flat portions;

(b) measuring intensity level of light reflected from the first areas and intensity level of light reflected from the second areas;

(c) differencing the intensity levels of light measured in step (b) to obtain a first signal level;

(d) repeating steps (a), (b) and (c) on other first and second areas to obtain a second signal level; and (e) correcting the relative angle between the light beam and the information medium based on a difference between the first signal level and the second signal level.

20. The method of claim 19 in which step (e) includes correcting the relative angle between the light beam and the information medium in an angular direction that increases the second signal level toward the first signal level, if the second signal level is smaller in value than the first signal level.

21. The method of claim 19 in which step (e) includes correcting the relative angle between the light beam and the information medium in an angular direction that increases the first signal level toward the second signal level, if the first signal level is smaller in value than the second signal level.

22. The method of claim 19 in which the intensity level of light reflected from the first areas is expressed as level G, the intensity level of light reflected from the second areas is expressed as level L, the first signal level is expressed as $TH_a$, and the second signal level is expressed as $TH_b$; and the method further including the steps of:

obtaining the first signal level, $TH_a$, in step (c) using the following relationship:

$$TH_a = \frac{level\ La - level\ Ga}{level\ La + level\ Ga}$$

obtaining the second signal level, $TH_b$, in step (d) using the following relationship:

$$THb = \frac{level\ Lb - level\ Gb}{level\ Lb + level\ Gb}$$

and step (e) includes correcting the relative angle between the light beam and the information medium in an angular direction that increases the smaller value of either THa or THb to obtain the larger value of either THa or THb.

* * * * *